(12) United States Patent
Inoue et al.

(10) Patent No.: US 6,791,646 B2
(45) Date of Patent: Sep. 14, 2004

(54) LIQUID CRYSTAL DISPLAY DEVICE HAVING PARTICULAR ALIGNMENT TREATMENTS

(75) Inventors: Hiroyasu Inoue, Kawasaki (JP); Keiji Imoto, Kawasaki (JP)

(73) Assignee: Fujitsu Display Technologies Corporation, Kawasaki (JP)

( * ) Notice: Subject to any disclaimer, the term of this patent is extended or adjusted under 35 U.S.C. 154(b) by 0 days.

(21) Appl. No.: 08/957,898

(22) Filed: Oct. 27, 1997

(65) Prior Publication Data

US 2002/0012089 A1 Jan. 31, 2002

(30) Foreign Application Priority Data

Apr. 30, 1997 (JP) .............................................. 9-112477

(51) Int. Cl.[7] ........................ G02F 1/1337; G02F 1/141
(52) U.S. Cl. ........................ 349/124; 349/123; 349/126; 349/136
(58) Field of Search ................................. 349/124, 123, 349/127, 126, 136, 129

(56) References Cited

U.S. PATENT DOCUMENTS

| | | | | |
|---|---|---|---|---|
| 4,911,958 A | * | 3/1990 | Mochizuki et al. | 428/1 |
| 5,280,375 A | * | 1/1994 | Tsuda et al. | 359/76 |
| 5,666,178 A | * | 9/1997 | Hirata et al. | 349/136 |
| 5,691,792 A | * | 11/1997 | Mizushima et al. | 349/124 |
| 5,764,327 A | * | 6/1998 | Hunyu et al. | 349/133 |
| 5,781,262 A | * | 7/1998 | Suzuki et al. | 349/128 |
| 5,786,041 A | * | 7/1998 | Takenaka et al. | 428/1 |
| 5,796,458 A | * | 8/1998 | Koike et al. | 349/126 |
| 5,959,707 A | * | 9/1999 | Murai et al. | 349/129 |
| 6,323,932 B1 | * | 11/2001 | Zhang et al. | 349/155 |
| 6,437,844 B1 | * | 8/2002 | Hattori et al. | 349/129 |
| 6,469,763 B2 | * | 10/2002 | Kim et al. | 349/124 |

* cited by examiner

Primary Examiner—Robert Kim
Assistant Examiner—Mike Qi
(74) Attorney, Agent, or Firm—Staas & Halsey LLP

(57) ABSTRACT

A liquid crystal display panel comprises first and second substrates and a liquid crystal inserted therebetween. The first substrate has active elements, picture electrodes and a first alignment film, and the second substrate has a common electrode and a second alignment film. The first and second alignment films are treated such that the liquid crystal molecules adjacent to the alignment films are oriented in predetermined directions (by rubbing), and at least one of the first and second alignment films is at least partly treated such that its surface condition is changed in order to restrain movement of the liquid crystal molecules (by UV irradiation).

17 Claims, 16 Drawing Sheets

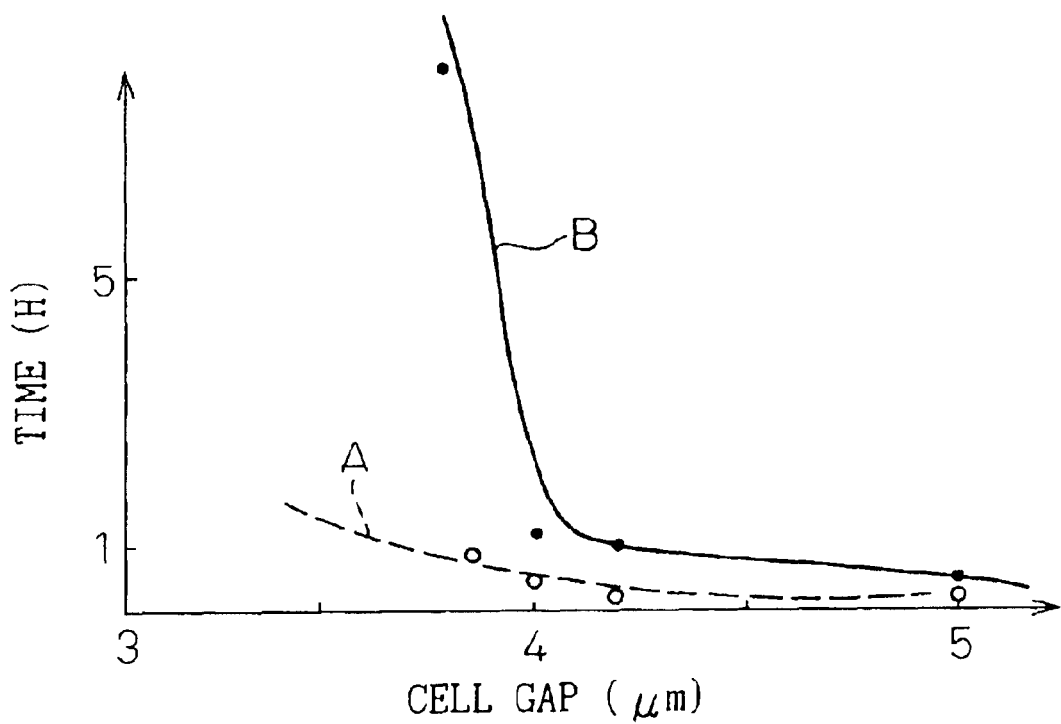

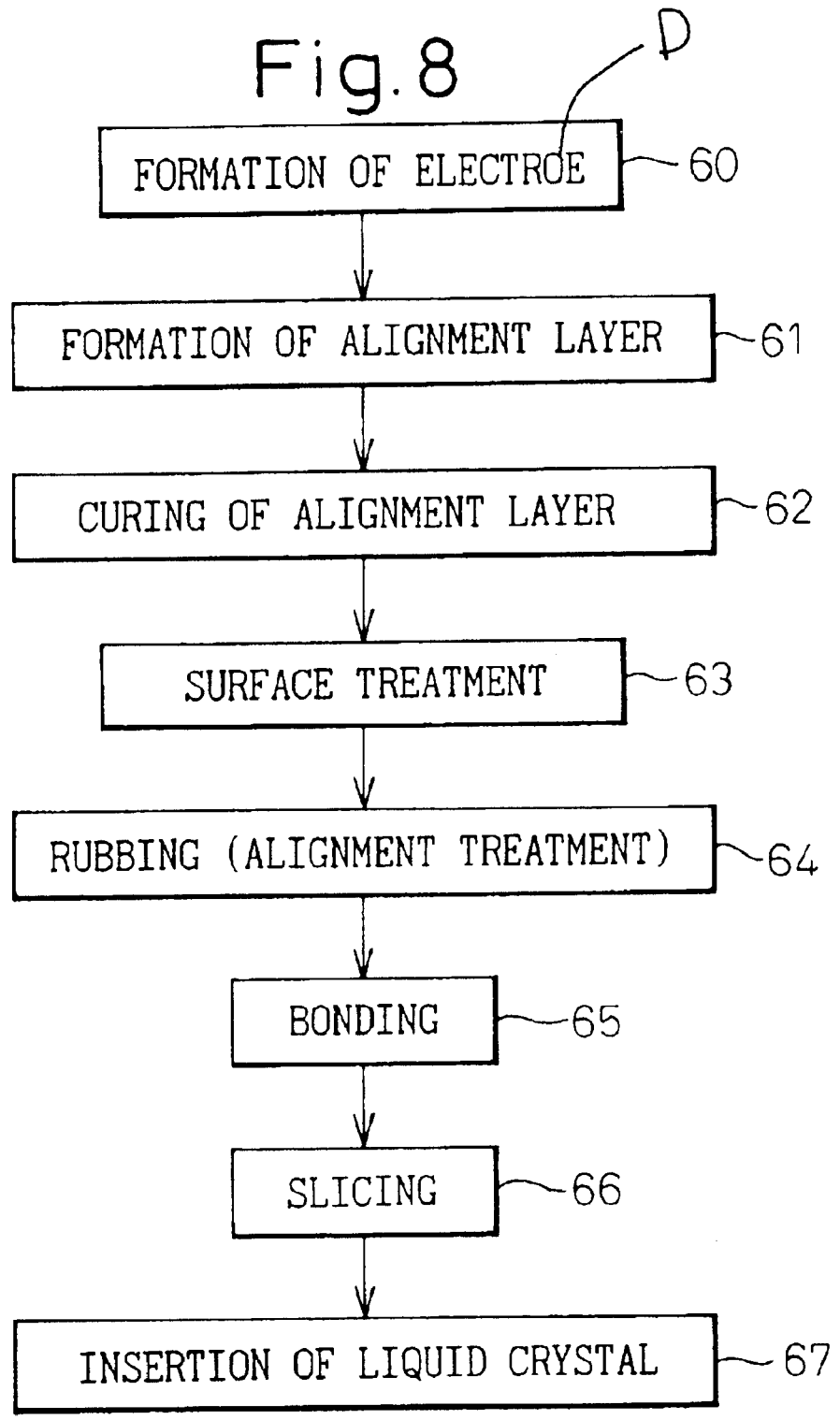

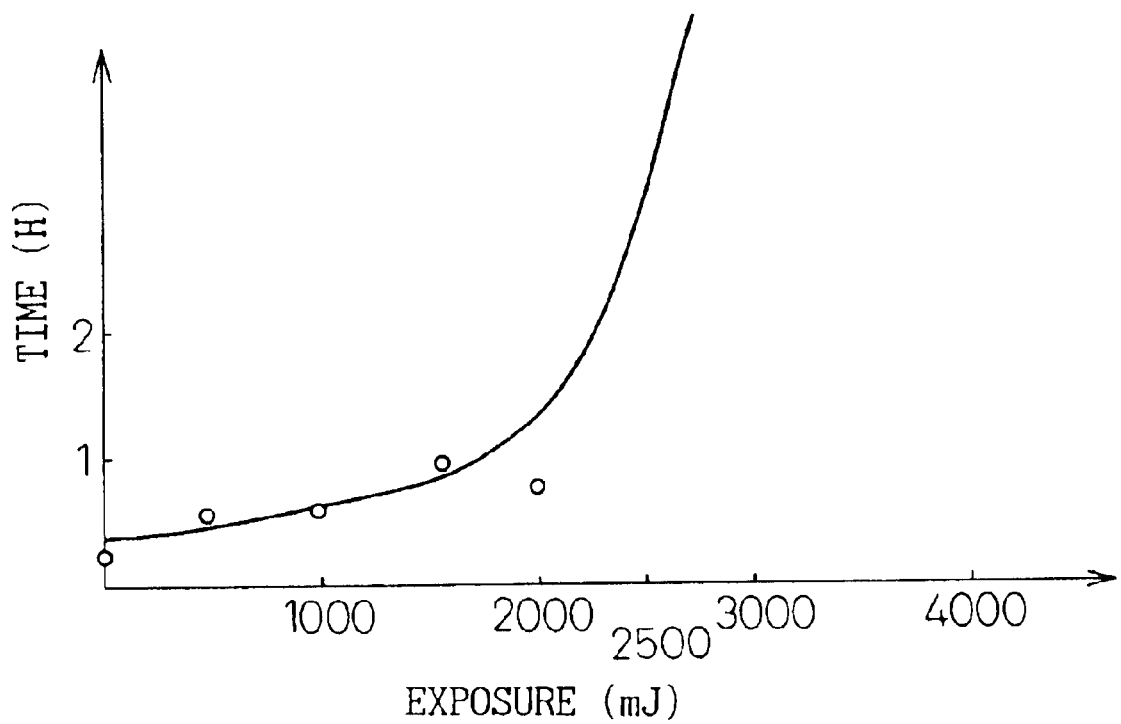

LIQUID CRYSTAL DISPLAY DEVICE HAVING PARTICULAR ALIGNMENT TREATMENTS

BACKGROUND OF THE INVENTION

1. Field of the Invention

The present invention relates to a liquid crystal display panel.

2. Description of the Related Art

A liquid crystal display panel includes a liquid crystal inserted between the first substrate and the second substrate. Transparent electrodes are formed on the first and second substrates, so that a voltage can be applied to the liquid crystal. In a twisted nematic liquid crystal display panel, alignment films are formed on the first and second substrates, and rubbing is effected to the alignment films in mutually perpendicular directions. The liquid crystal molecules adjacent to the first and second substrates are oriented along the rubbing direction. Between the first and second substrates, the liquid crystal is twisted by 90 degrees from the side of the one substrate toward the side of the other substrate.

In recent years, an active matrix drive has been employed to improve the resolution. The active matrix drive comprises a plurality of small picture electrodes, orthogonal bus lines (gate bus lines and drain bus lines) and active elements such as TFTs provided on one of the substrates. The electrode on the other substrate is a common electrode. By controlling the TFTs, an electric field is formed between a particular picture electrode and the common electrode to produce a display. In the active matrix-driven liquid crystal display device, the region of the picture electrode serves as a pixel (when there is a black matrix, an opening of the black matrix serves as a pixel).

Japanese Unexamined Patent Publication (Kokai) No. 5-5886 discloses an STN liquid crystal panel in which row electrodes are formed on one substrate and column electrodes are formed on the other substrate, and a region where the row electrode overlaps the column electrode serves as a pixel. However, the STN liquid crystal display panel does not employ the active matrix drive. In order to decrease the leakage of light without using black matrix according to this publication, after the alignment film is rubbed, only the portions outside the pixels are irradiated with ultraviolet rays, so that a pretilt angle of the liquid crystal increases in the portions outside the pixels. The invention of the present application utilizes the irradiation of ultraviolet rays, but the present invention is directed to solve a problem that stems from the employment of the active matrix drive, and the object of the present invention is different from the object of irradiation of ultraviolet rays of the above publication.

As liquid crystal display panels employing the active matrix drive made larger, there arises a problem concerning uniformity in the display of the liquid crystal display panels. When a voltage is continuously applied to the whole surface of, for example, a 21-inch liquid crystal display panel, for extended periods of time, a white uneven pattern appears in the display near the corners of the display screen.

SUMMARY OF THE INVENTION

The object of the present invention is to provide a liquid crystal display panel in which an uneven pattern does not appear in the display even when the panel is fabricated in a larger size.

According to the present invention, the liquid crystal display panel comprises first and second substrates opposed to each other; a liquid crystal inserted between the first and second substrates; the first substrate having bus lines, active elements, picture electrodes and a first alignment film; the second substrate having a common electrode and a second alignment film; and wherein the first and second alignment films are treated such that the liquid crystal molecules adjacent to each alignment film are oriented in a predetermined direction, and at least one of the first and second alignment films is at least partly treated such that its surface condition is changed to restrain the movement of the liquid crystal.

In analyzing an uneven pattern that appears in the display when a voltage is applied, it has been found that the thickness of the cell gap of a portion of the liquid crystal display device where the uneven pattern appears in the display is larger than the thickness of the cell gap of other portions. When no voltage is applied, an uneven pattern does not appear and there is no change in the thickness of the cell gap. From this fact, it is thought that the uneven pattern is caused by the fact that liquid crystal moves while the voltage is being applied. According to the present invention, therefore, treatment is carried out to change the surface condition of the alignment film in order to restrain the movement of the liquid crystal. As a result, it is possible to eliminate an uneven pattern in the display.

Preferably, the treatment for changing the surface condition of the alignment film is effected by irradiation of ultraviolet rays. In this case, it is desired that the irradiation of ultraviolet rays is effected maintaining energy of not smaller than 2500 mJ. Or, the treatment for changing the surface condition of the alignment film is effected by changing the material of the alignment film.

Preferably, the orientation treatment is effected by rubbing. In this case, the orientation treatment is effected after the treatment for changing the surface condition of the alignment film.

Preferably, the treatment for changing the surface condition of the at least one alignment film is effected for both the first and second alignment films. In this case, the treatment for changing the surface condition of the at least one alignment film is effected for part of the first alignment film and for part of the second alignment film. Treated portions of the first alignment film can be brought into alignment with nontreated portions of the second alignment film, and nontreated portions of the first alignment film can be brought into alignment with treated portions of the second alignment film.

Or, the treatment for changing the surface condition of the at least one alignment film is effected for one of the first and second alignment films. In this case, the treatment for changing the surface condition of the at least one alignment film is effected for the whole surface or for only part of the surface of either one of the first alignment film or the second alignment film.

Preferably, the treatment for changing the surface condition of the alignment film is effected for at least either one of the first alignment film or the second alignment film in a striped fashion traversing a plurality of pixel regions.

Preferably, the treatment for changing the surface state of the alignment film is effected for the regions covering the bus lines, and the pixel regions are not subjected to the treatment for changing the surface state of the alignment film.

Preferably, a spacer is inserted between the first substrate and the second substrate.

BRIEF DESCRIPTION OF THE DRAWINGS

The present invention will become more apparent from the following description of the preferred embodiments with reference to the accompanying drawings, in which:

FIG. 7 is a view illustrating the relationship between the cell gap and the time during which the unevenness appears in the display.

FIG. 8 is a flow chart of a process for fabricating the liquid crystal display panel;

FIG. 9 is a view illustrating the relationship between the exposure to ultraviolet rays for surface treatment and the time during which unevenness appears in the display;

DESCRIPTION OF THE PREFERRED EMBODIMENTS

FIGS. 1A to 4 are views illustrating a liquid crystal display panel 10 according to the present invention.

Figure 2:
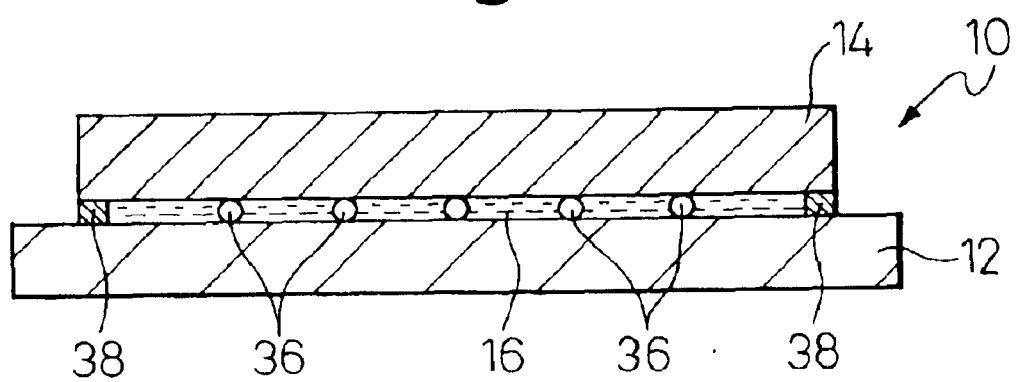
FIG. 2 is a cross-sectional view of the liquid crystal display panel.

In FIG. 2, the liquid crystal display panel 10 includes a liquid crystal 16 inserted between transparent first and second glass substrates 12 and 14 that are opposed to each other. Spacers (small balls) 36 are arranged on the inner surface of the first substrate 12, and the second substrate 14 is attached to the first substrate 12 using a peripheral seal 38 of an adhesive component. The spacers 36 are inserted to maintain the thickness of the liquid crystals 16 constant, i.e., to maintain a cell gap constant (e.g., 4 μm).

Figure 3:
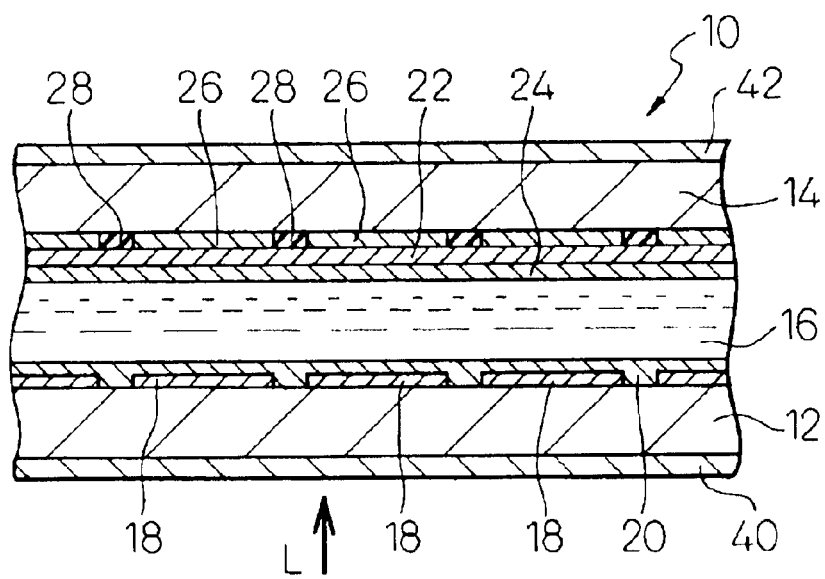
FIG. 3 is a cross-sectional view of the liquid crystal display panel having electrodes and alignment films, showing details of the structure of FIG. 2.

FIG. 3 is a view illustrating the details of the liquid crystal display panel 10. FIG. 3 is only for explaining the interior of the liquid crystal display panel 10 but does not strictly indicate a dimensional relationship. The liquid crystal 16 is inserted between the first and second substrates 12 and 14, and a polarizer 40 and an analyzer 42 are arranged on either side of the first and second substrates 12 and 14.

The first substrate 12 includes a plurality of picture electrodes 18 and an alignment film 20. The second substrate 14 includes a common electrode 22 and an alignment film 24. A color filter 26 is formed under the common electrode 22 of the second substrate 14, and a black matrix 28 is provided among the R, G and B color portions of the color filter 26. The R, G and B color portions of the color filter 26 are arranged in correspondence with the picture electrodes 18.

Figure 4:
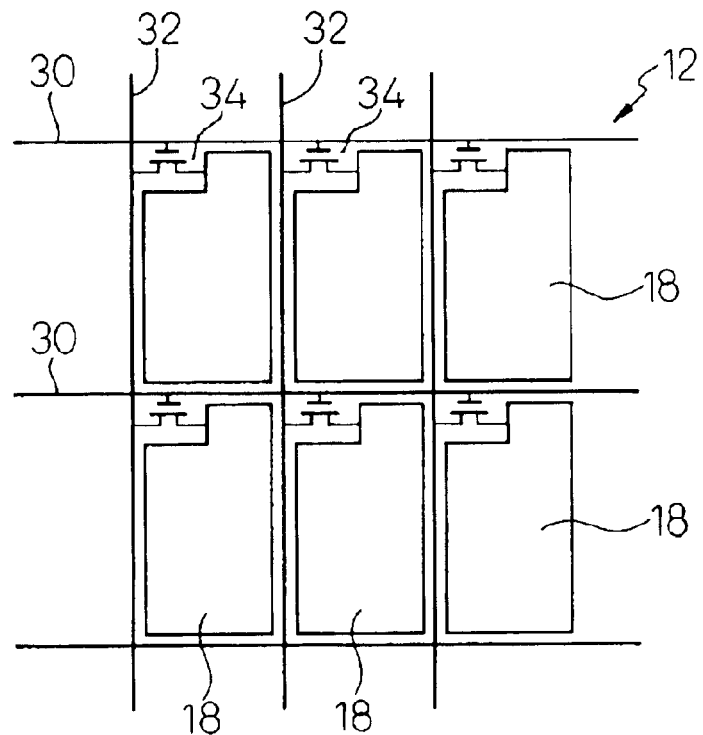
FIG. 4 is a view illustrating the active matrix drive structure.

FIG. 4 is a view illustrating an active matrix drive circuit that is formed on the first substrate 12 together with picture electrodes 18. The active matrix drive circuit includes gate bus lines 30 and drain bus lines 32 which are orthogonal to each other, and thin-film transistors (TFTs) 34. The picture electrodes 18 are connected to the gate bus lines 30 and to the drain bus lines 32 via TFTs 34. These constituent members are fabricated by a known thin-film technology.

Figure 5:
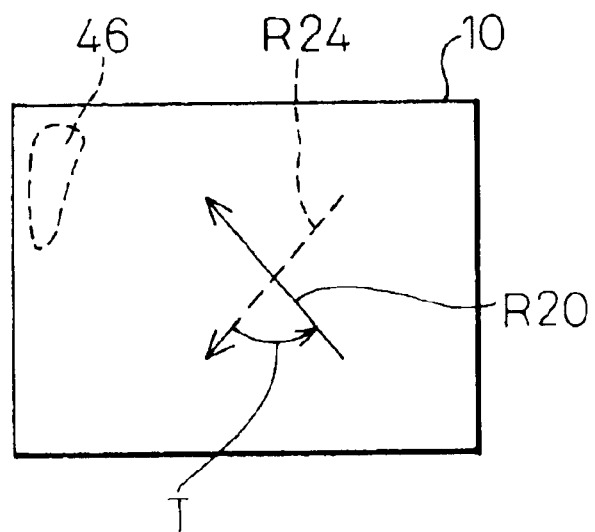
FIG. 5 is a plan view of the liquid crystal display panel, explaining the uneven pattern appearing in the display.

FIG. 5 schematically illustrates the liquid crystal display panel 10 when a viewer sees the second substrate 14 where light is made incident in the direction indicated by the arrow L in FIG. 3. FIG. 5 further illustrates the orientation treatment for the alignment films 20 and 24. The orientation treatment is effected by rubbing the alignment films 20 and 24. An arrow R20 denotes a direction for rubbing the alignment film 20 on the side of incidence of light, and R24 denotes a direction of rubbing the alignment film 24 on the side of the viewer. The liquid crystal molecules adjacent to the alignment film 20 of the first substrate 12 are oriented in a predetermined direction in compliance with the rubbing direction R20, and the liquid crystal molecules adjacent to the alignment film 24 of the second substrate 14 are oriented in a predetermined direction in compliance with the rubbing direction R24. The liquid crystal 16 twists from the side of the first substrate 12 toward the side of the second substrate 14 as indicated by an arrow T. In the TN liquid crystal display device, the twisting angle is typically 90 degrees.

Therefore, linear polarized light that has passed through the polarizer 40 falls on the first substrate 12 and turns in compliance with the twisted liquid crystal 16 as it passes through the liquid crystal 16. When no voltage is applied to the liquid crystal 16, the linear polarized light passes through the analyzer 42. When a voltage is applied to the liquid crystal 16, the liquid crystal molecules are tilted up with respect to the surface of the substrates, and the linear polarized light is interrupted by the analyzer 42. Upon controlling the application of voltage, therefore, a contrast is created in the brightness to display an image.

When a large liquid crystal display panel 10 (having a display screen of, for example, 21 inches) is in a fully black condition by applying a voltage, an uneven pattern 46 appears on a portion of the display screen after the passage of a given period of time. For example, when about one hour passes after the whole display screen is in a black condition by applying a voltage, a white uneven pattern 46 appears in the black display. The uneven pattern 46 disappears when the application of voltage is discontinued for more than a given period of time.

To realize a large liquid crystal display panel 10, therefore, it is necessary to eliminate the uneven pattern 46 that appears when a voltage is applied. The present inventors have analyzed the uneven pattern 46 as follows.

It has been found that the uneven pattern 46 appears in the corner and in the periphery of the display screen, on the side pointed to by the rubbing direction R20 of the alignment film 20 of the first substrate 12 on which the active matrix drive circuit is formed. In FIG. 5, the rubbing direction R20 points to the upper left and, hence, the uneven pattern 46 appears on the left upper corner of the display screen. When the rubbing direction R20 is directed toward the lower right, the uneven pattern 46 appears on the right lower corner of the display screen. Thus, the uneven pattern 46 appears depending upon the orientation characteristics of the first substrate 12 having the active matrix drive circuit.

A study of the liquid crystal display panel 10 on which the uneven pattern 46 appears indicates that the cell gap becomes smaller to some extent in the central portion of the liquid crystal display panel 10 and the cell gap becomes larger to some extent in a portion where the uneven pattern 46 appears. Accordingly, the optical characteristics locally change so that the uneven pattern 46 appears. From this fact, it has been learned that in the liquid crystal display panel 10 on which the uneven pattern 46 appears, the liquid crystal 16 partly moves from the central portion to the peripheral portion in the liquid crystal display panel 10.

Figure 6:
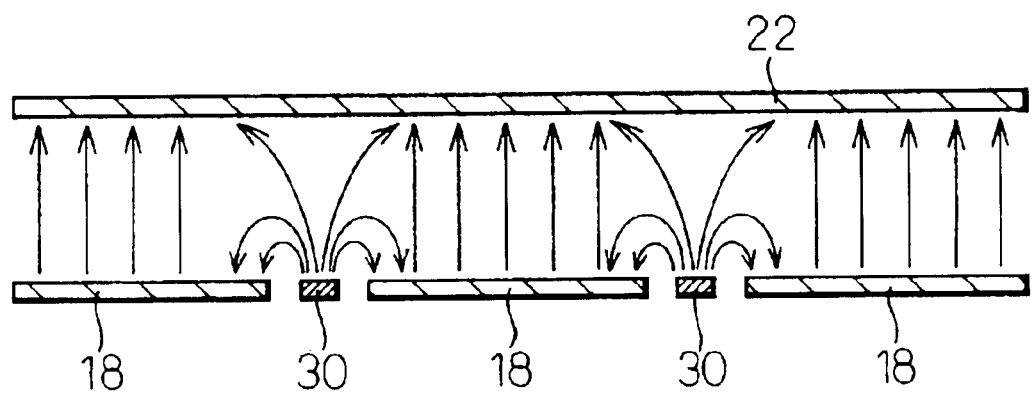
FIG. 6 is a cross-sectional view illustrating the electric field formed between the common electrode, picture electrodes, and gate bus lines.

Referring to FIG. 6, the uneven pattern 46 appears probably due to the fact that the first substrate 12 has the active matrix drive circuit including the picture electrodes 18, and the second substrate 14 has the common electrode 22, so that an asymmetrical electric field is formed. That is, the gate bus lines 30 are extended among the picture electrodes 18 on the side of the first substrate 12, and a pulse-like voltage is periodically applied to the gate bus lines 30. Near the gate bus lines 30 are established an electric field that is directed from the gate bus lines 30 to the common electrode 22 and an electric field that is directed from the gate bus lines 30 to the picture electrodes 18. Thus, an asymmetric electric field is established near the gate bus lines 30 and the tilting of the liquid crystal 16 becomes vertically asymmetrical. When a voltage is continuously applied, therefore, the liquid crystal molecules move along the alignment films 20 and 24, and the cell gap varies.

FIG. 7 shows the result of measurement of time until the uneven pattern 46 appears, using the liquid crystal display devices having various cell gaps. A broken line A represents the case of an ordinary active matrix drive in which a pulse-like voltage is periodically applied to the gate bus lines 30, and a solid line B represents the case when a voltage is continuously applied to the gate bus lines 30. The uneven pattern 46 hardly appears in the case of the solid line B but easily appears in the case of the broken line A. The uneven pattern 46 appears less frequently as the cell gap decreases.

The uneven pattern 46 easily appears with an increase in the frequency of a pulse-like voltage that is applied to the gate bus lines 30. As the voltage applied to the gate bus lines 30 increases, however, the uneven pattern 46 appears less frequently. From these facts, it is considered that the uneven pattern 46 appears due to asymmetrical electric field which stems from the active matrix drive.

In order to eliminate the uneven pattern 46 according to the present invention, the surface condition of the alignment film is at least partly changed to restrain movement of liquid crystal in at least one of the alignment films 20 and 24.

Figure 1A:
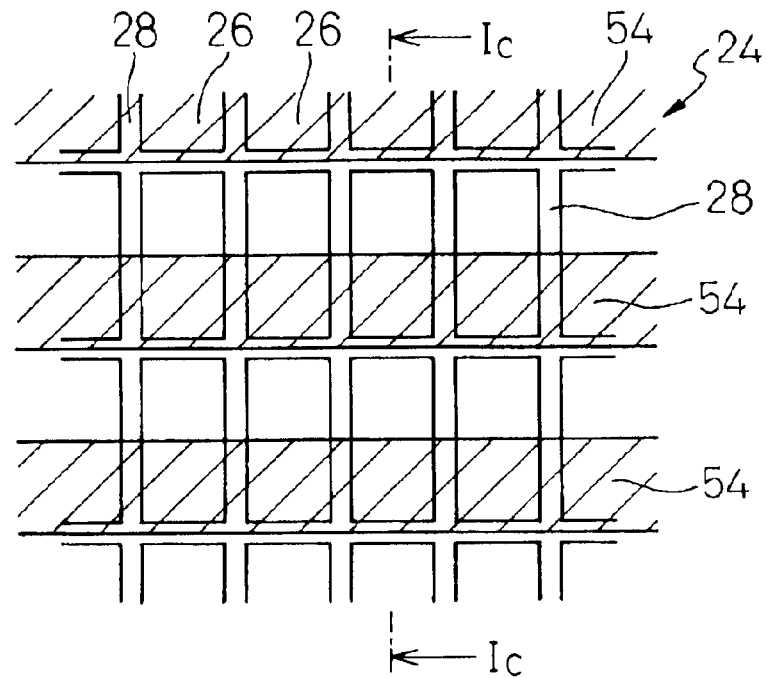
FIGS. 1A to 1C are views illustrating the surface treatment of alignment films according to the embodiment of the present invention.
Figure 1B:
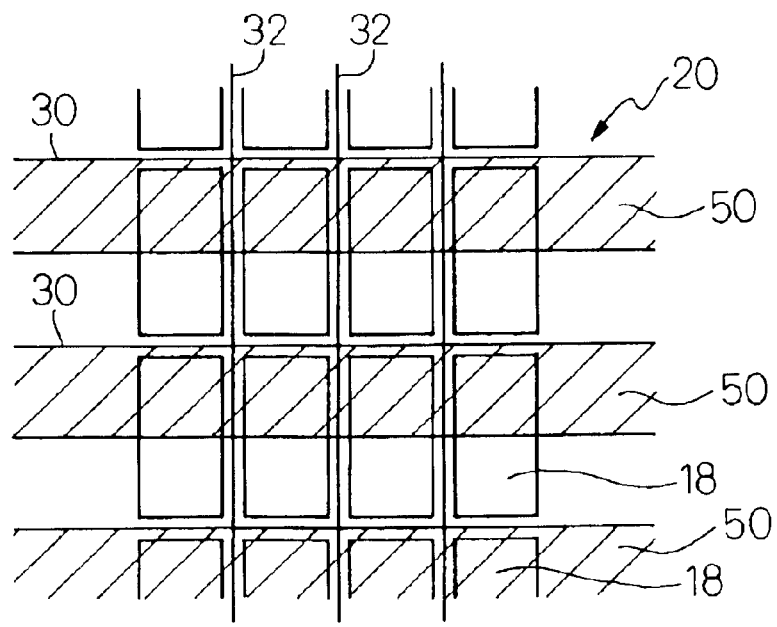

FIGS. 1A and 1B are views illustrating an example of the treatment for changing the surface condition of the alignment films to eliminate the display shade 46, wherein FIG. 1A shows the alignment film 24 on the side of the viewer and FIG. 1B shows the alignment film 20 on the side of the incident light. The alignment films 20 and 24 are transparent, so for convenience, the layers under the alignment films 20, 24 are also shown. That is, under the alignment film 20 on the side of incidence of light are shown picture electrodes 18, gate bus lines 30 and drain bus lines 32, and under the alignment film 24 on the side of the viewer are shown the color filter 26 and the black matrix 28.

Regions treated to change the surface condition of the alignment films (hereinafter referred to as a surface treatment) are indicated by hatchings 50 and 54. In FIGS. 1A and 1B, the surface-treated regions 50, 54 pass through a plurality of picture electrodes 18 to form stripe patterns that are delimited by the centers of the pixels and the gate bus lines 30.

Figure 1C:
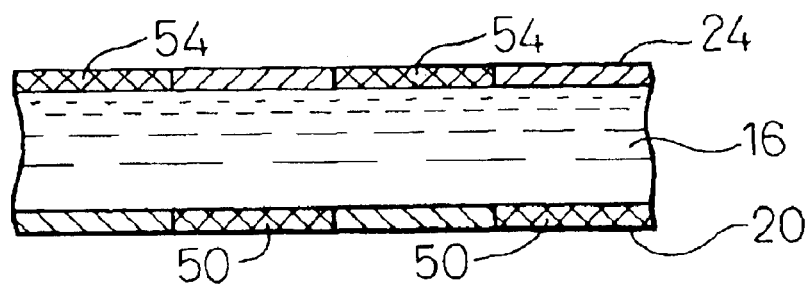

FIG. 1C is a cross-sectional view of the liquid crystal display panel 10 in an assembled condition, taken along the line Ic—Ic of FIG. 1. The twist is neglected here. In this condition, the liquid crystal molecules are arranged in a predetermined direction, i.e., in the left upper direction in FIG. 1C. This relationship does not change even when the twist is taken into consideration. As shown in FIGS. 1A to 1C, the surface-treated regions 50 of the alignment film 20 on the side of incidence of light are in alignment with the regions of the surfaces of the alignment film 24 on the side of the viewer which have not been treated. Similarly, the surface-treated regions 54 of the alignment film 24 on the side of the viewer are in alignment with the regions of the surfaces of the alignment film 20 on the side of incidence of light which have not been treated.

The surfaces are treated by forming masks on the alignment films 20 and 24 and by irradiating ultraviolet rays. The alignment films 20, 24 are rubbed, so that the liquid crystal molecules are orientated with respect to the alignment films 20, 24 under the substantially predetermined orientation regulating forces. Upon irradiating the alignment films 20, 24 with ultraviolet rays, in general, the orientation regulating force for the liquid crystal molecules adjacent to the surface-treated regions 50, 54 irradiated with ultraviolet rays of alignment films 20, 24, becomes greater than the orientation regulating force for the liquid crystal molecules adjacent the regions that are not irradiated with ultraviolet rays of the alignment films 20, 24, so that the liquid crystal molecules do not tend to tilt up so much when a voltage is applied. Even when the surface is treated, the feature of rubbing shown in FIG. 5 is maintained, and the liquid crystal is twisted in a predetermined direction according to the twist T.

In the surface-treated regions 50 and 54 as described above, an increased orientation regulating force acts upon the liquid crystal molecules adjacent to the alignment films 20 and 24. As described above with reference to FIG. 6, the cause of the uneven pattern 46 stems from an asymmetrical electric field established near the gate bus lines 30 and an asymmetrical tilting of the liquid crystal 16. Therefore, when the surface of the portions of the alignment film 24 corresponding to the gate bus lines 30 are treated so that an increased orientation regulating force acts at least upon the liquid crystal molecules adjacent to these portions, the liquid crystal molecules are fixed by the orientation regulating force when the voltage is applied. While the voltage is being applied, therefore, the liquid crystal molecules are restrained from moving along the alignment films 20, 24, and the uneven pattern 46 is not readily formed even when the voltage is kept applied.

To eliminate the uneven pattern 46, the surfaces of the portions (opposing portions) of the alignment film 24 opposed to the gate bus lines 30 need not necessarily be treated. The surfaces of a wide region including the opposing portions of the alignment film 24 may be treated. Or, even if the opposing portions are not included, the surfaces of the suitable portions of the alignment film 24 may be treated, such that an average effect acts on the alignment film 24 as a whole to decrease the asymmetrical tilting of the liquid crystal molecules when the voltage is applied. Or, the surface of the alignment film 24 as a whole may be treated. Besides, the surfaces of both alignment films 20 and 24 may be treated. In this case, if the treated surface area of one alignment film 20 is selected to be nearly the same as the treated surface area of the other alignment film 24, the inductance changes equally in the two alignment films 20 and 24 due to the irradiation with ultraviolet rays. It is further possible to treat the surface of the alignment film 20 to decrease the asymmetrical tilting of the liquid crystal molecules when the voltage is applied.

FIG. 8 is a flow chart of a method for fabricating the liquid crystal display panel 10. Electrodes are formed at a step 60. The color filter 26 and the black matrix 28 are formed on the second substrate 14 in advance. Forming the electrodes at the step 60 includes forming the common electrode 22 on the second substrate 12 and forming the picture electrodes 18 on the first substrate 12. The picture electrodes 18 are formed simultaneously with the formation of the active matrix drive structure while laminating the thin films.

At step 61, the alignment film 20 is formed on the first substrate 12 and the alignment film 24 is formed on the second substrate 14. The alignment films 20 and 24 are formed by applying the alignment film material onto the substrates by the spin-coating method or the like method, and baking the thus applied alignment film material at 150 to 250° C. (step 62). Then, at step 63, the surfaces of the alignment films 20 and 24 are treated. The surfaces are treated by forming masks on the alignment films 20 and 24, and by the irradiation with ultraviolet rays through, for example, a pattern shown in FIG. 1.

At step 64, the orientation treatment is effected by rubbing the alignment films 20 and 24. The rubbing is effected in the rubbing direction shown in FIG. 5. In the ordinary rubbing, the orientation regulating force is substantially constant for the liquid crystal. However, since the surfaces of the alignment films 20 and 24 have been treated, the orientation regulating force for the liquid crystal becomes greater in the surface-treated regions 50 and 54 after the liquid crystal display device 10 is assembled.

At step 65, spacers (small balls) 36 having a diameter corresponding to the cell gap are scattered on the alignment film of one substrate, a belt-like adhesive 38 is applied to the peripheral portions of the substrate, and another substrate is placed thereon and is stuck. Then, at a step 66, excess portions of the first and second substrates 12 and 14 are cut and at step 67, the liquid crystal 16 is inserted between the first and second substrates 12 and 14.

FIG. 9 is a view illustrating the relationship between the exposure to ultraviolet rays and the time until the uneven pattern 46 occurs. When irradiated with ultraviolet rays with energy of not lower than 2500 mJ, the time is lengthened considerably before the uneven pattern 46 occurs, and the problem of the uneven pattern 46 is substantially eliminated. When irradiated with ultraviolet rays with an energy of not smaller than 300 mJ, the uneven pattern 46 hardly occurs.

Figure 10A:
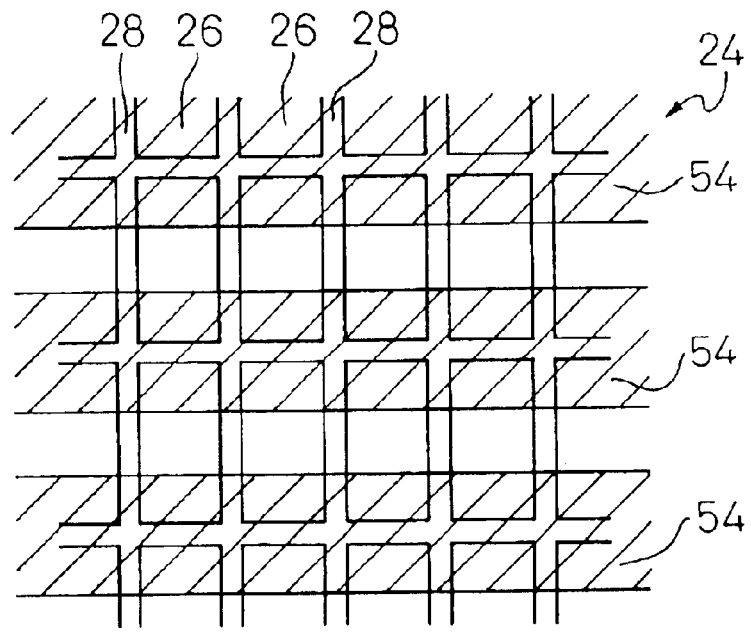
FIGS. 10A and 10B are views illustrating another example of the surface treatment for the alignment films.
Figure 10B:
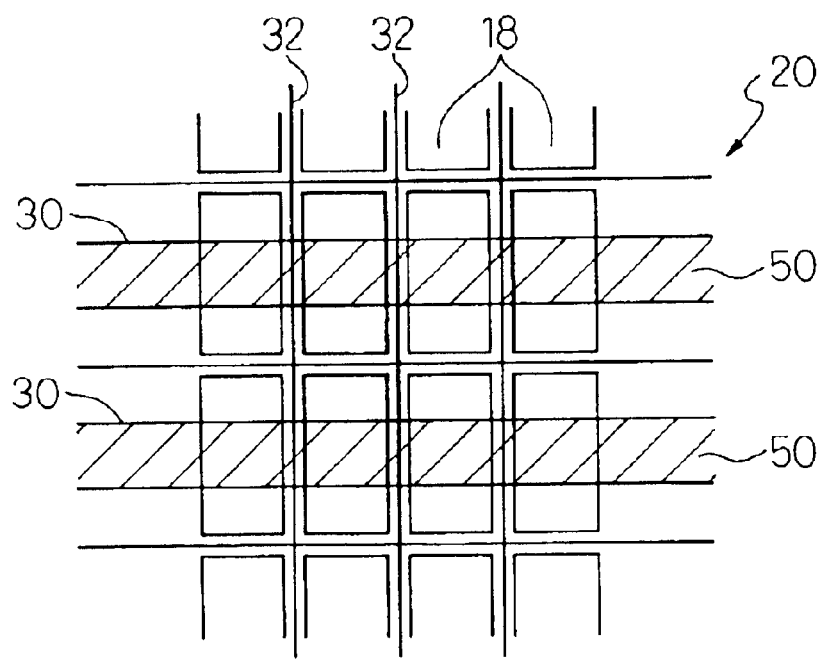

FIGS. 10A and 10B are views illustrating another example of the treatment for changing the surface condition of the alignment films for eliminating the uneven pattern 46.

In FIGS. 10A and 10B and in the subsequent figures, the figure number with an "A" appended shows the alignment film 24 of the side of the viewer, and the figure number with a "B" appended shows the alignment film 20 of the side of incidence of light. The treated (surface-treated) regions for changing the surface condition of the alignment films are indicated by hatchings 50 and 54. In FIGS. 10A and 10B, the surface-treated regions 50 form a stripe pattern that passes through the centers of a plurality of picture electrodes 18, and the surface-treated regions 54 form a stripe pattern that passes through a plurality of picture electrodes 18 and is defined by lines passing through the picture electrodes 18.

Figure 11A:
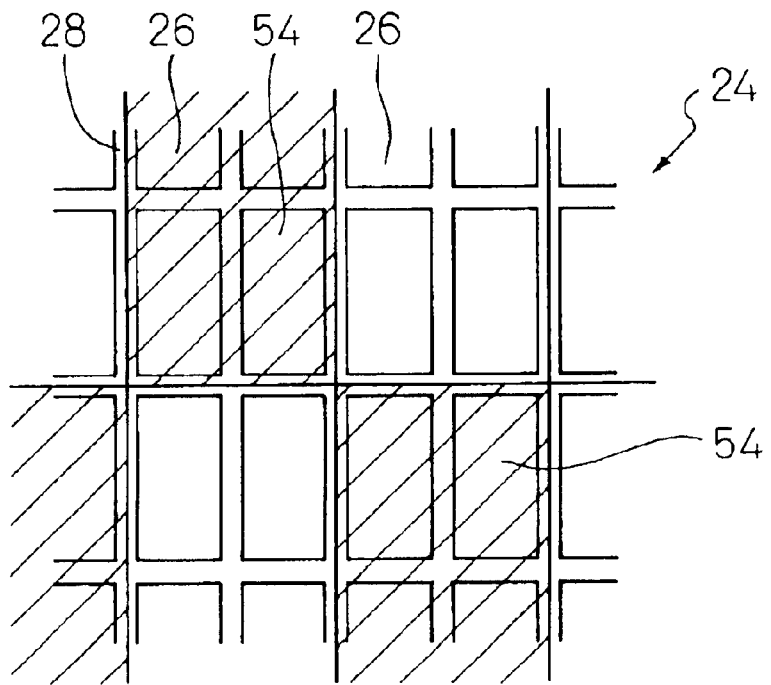
FIGS. 11A and 11B are views illustrating a further example of the surface treatment for the alignment films.
Figure 11B:
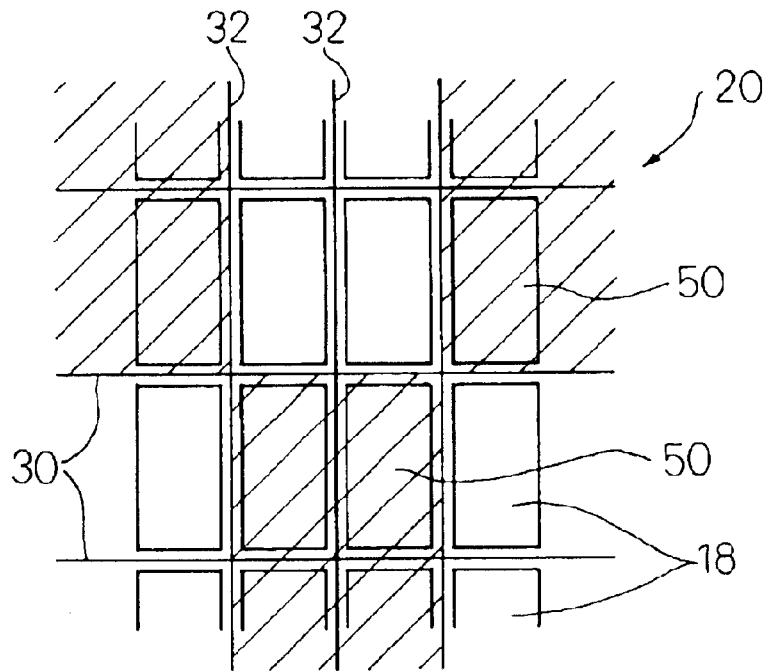

FIGS. 11A and 11B are views illustrating a further example of the treatment for changing the surface condition of the alignment films for eliminating the uneven pattern 46. The surface-treated regions 50 include a plurality of picture electrodes 18, and the surface-treated regions 54 include a plurality of picture electrodes 18.

Figure 12A:
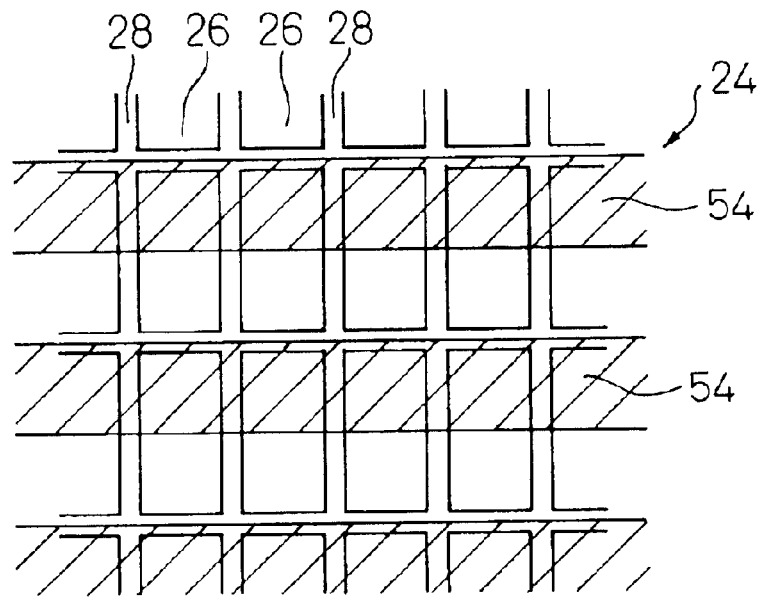
FIGS. 12A and 12B are views illustrating a still further example of the surface treatment for the alignment films.
Figure 12B:
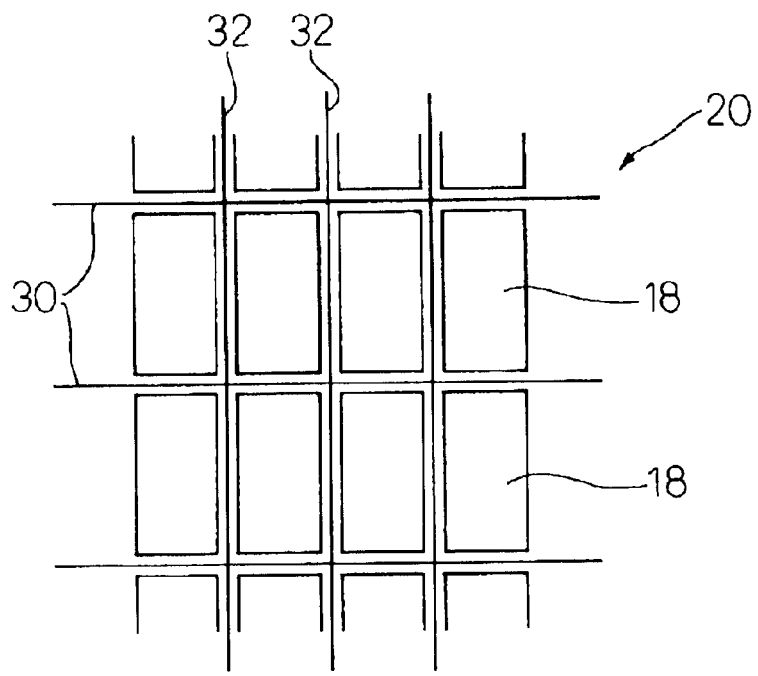

FIGS. 12A and 12B are views illustrating a still further example of the treatment for changing the surface condition of the alignment films for eliminating the uneven pattern 46. The alignment film 20 has no surface-treated region. The surface treated regions 54 of the other alignment film 24 form a stripe pattern like that of FIG. 1A.

Figure 13A:
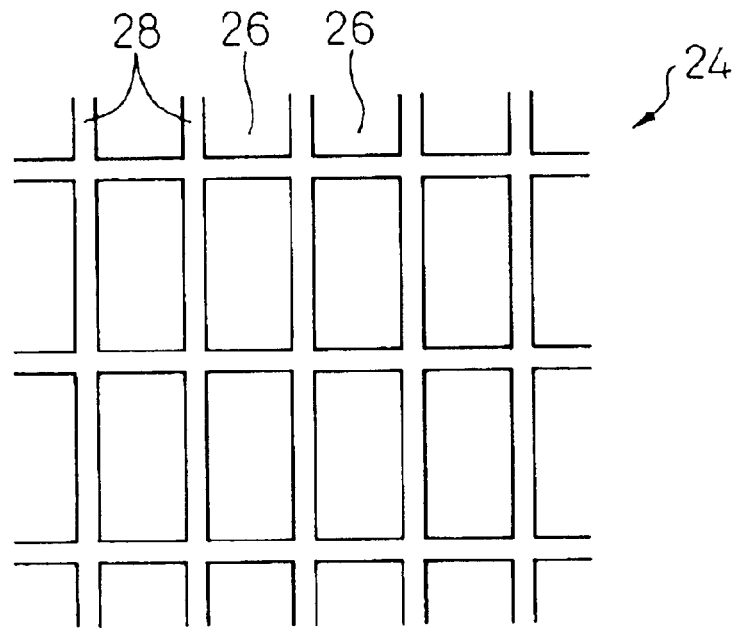
FIGS. 13A and 13B are views illustrating a yet further example of the surface treatment for the alignment films.
Figure 13B:
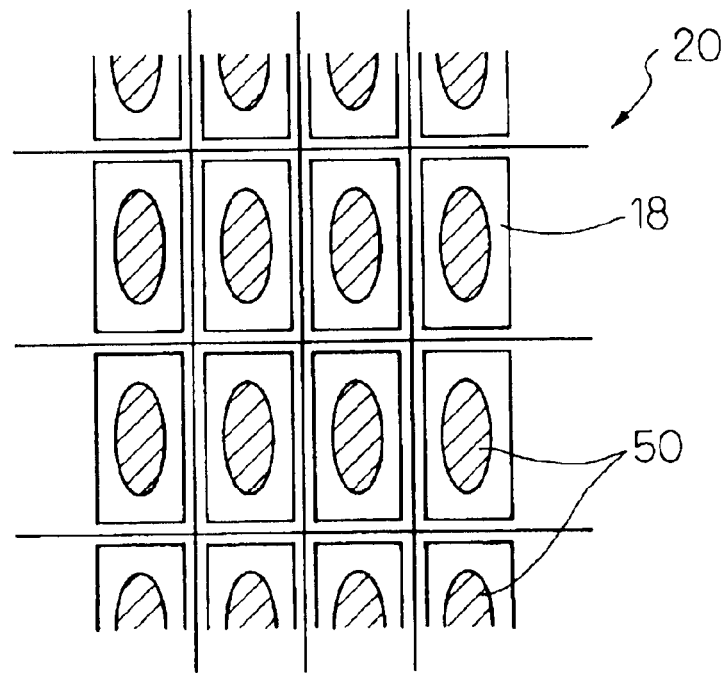

FIGS. 13A and 13B are views illustrating a yet further example of the treatment for changing the surface condition of the alignment films for eliminating the uneven pattern 46. The alignment film 24 has no surface-treated region. The surface-treated regions 50 of the other alignment film 20 are so provided as to be positioned inside the picture electrode 18, so will not to be laid on the gate bus lines 30 and the drain bus lines 32. Thus, a large pretilt angle of the liquid crystal is maintained for the gate bus lines 30 and the drain bus lines 32, and a small pretilt angle of the liquid crystal is maintained for the picture electrodes 18. Near the bus lines, it is often desired not to decrease the pretilt angle of the liquid crystal.

Figure 14A:
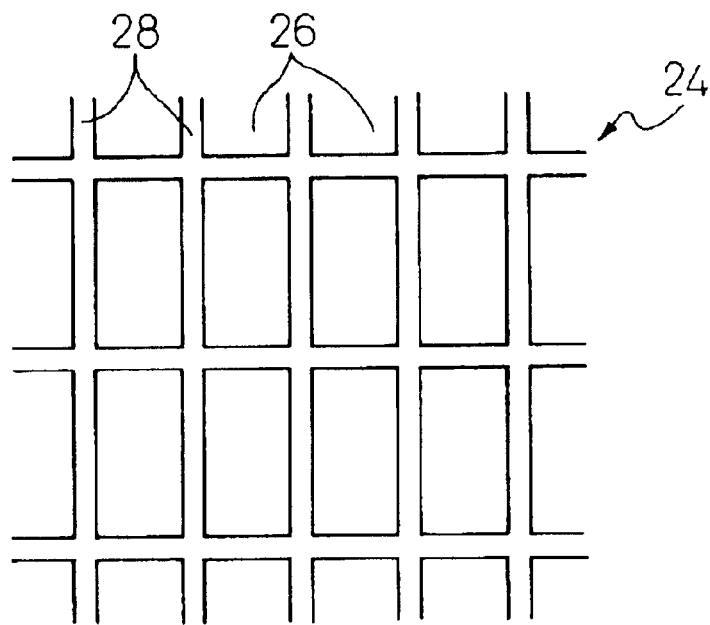
FIGS. 14A and 14B are views illustrating a further example of the surface treatment for the alignment films.
Figure 14B:
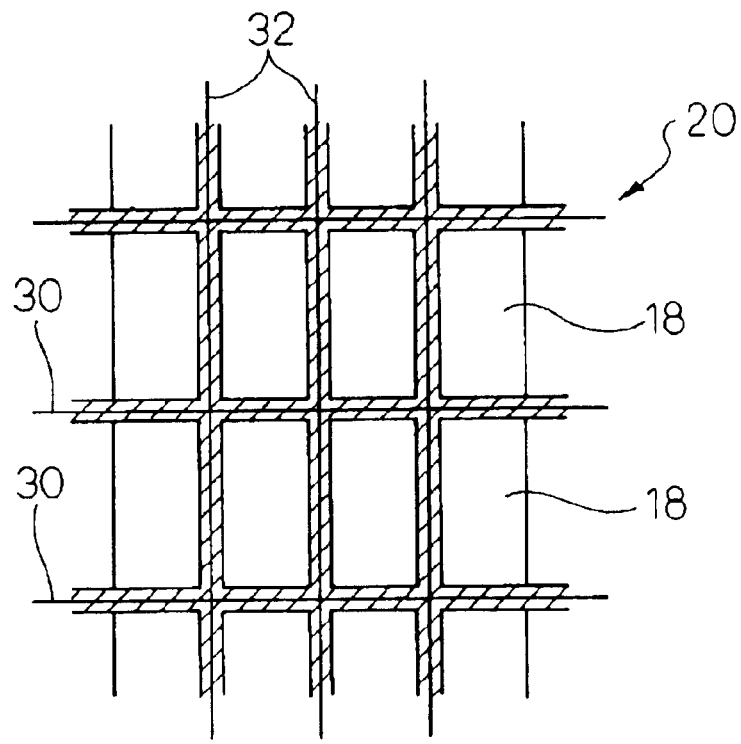

FIGS. 14A and 14B are views illustrating a further example of the treatment for changing the surface condition of the alignment films for eliminating the uneven pattern 46. The alignment film 24 has no surface-treated region. The surface-treated regions 50 of the other alignment film 20 are covering the gate bus lines 30 and the drain bus lines 32.

Figure 15A:
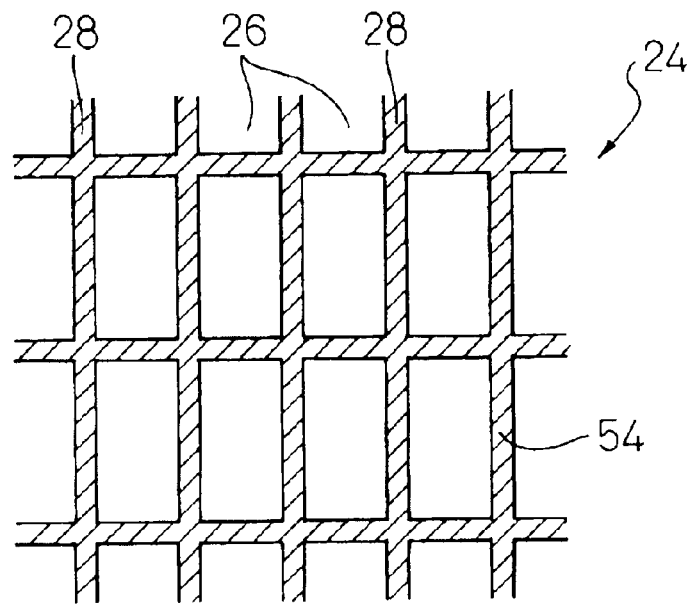
FIGS. 15A and 15B are views illustrating another example of the surface treatment for the alignment films.
Figure 15B:
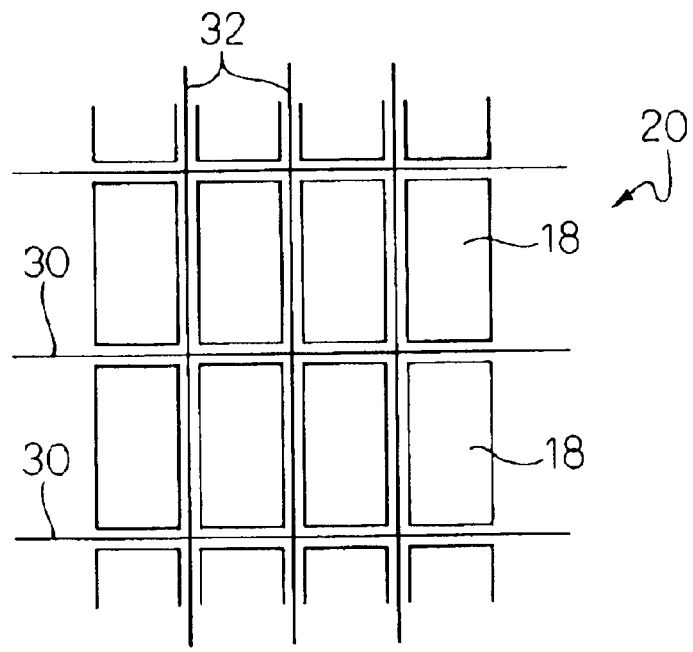

FIGS. 15A and 15B are views illustrating another example of the treatment for changing the surface condition of the alignment films for eliminating the uneven pattern 46. The alignment film 20 has no surface-treated region. The surface-treated regions 54 of the other alignment film 24 are covering the black matrix 28.

Figure 16A:
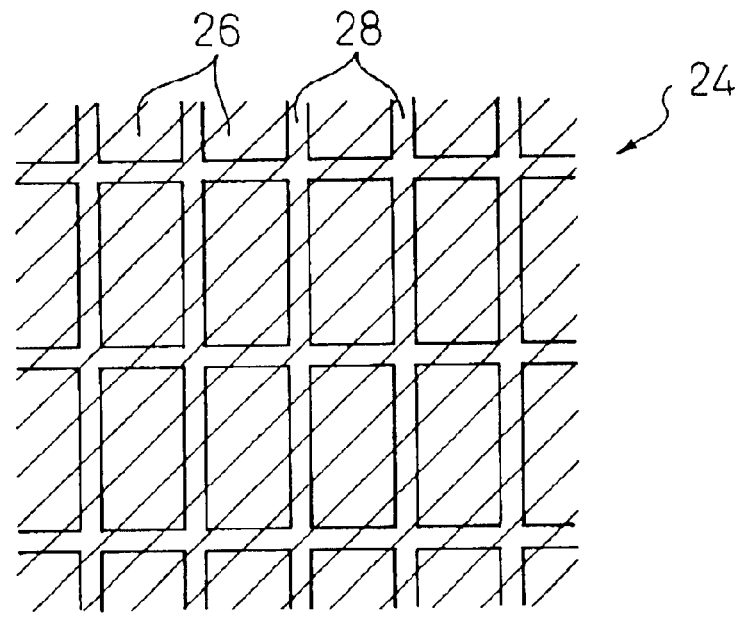
FIGS. 16A and 16B are views illustrating further example of the surface treatment for the alignment films.
Figure 16B:
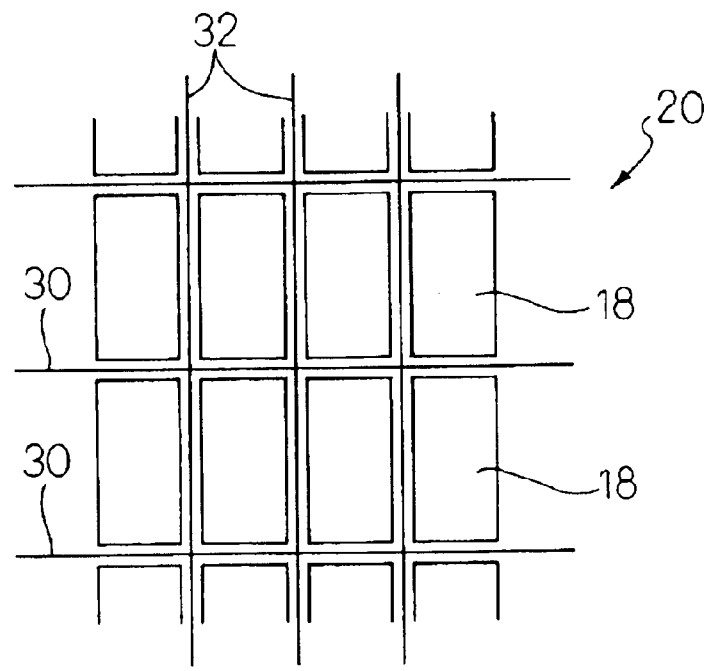

FIGS. 16A and 16B are views illustrating a yet further example of the treatment for changing the surface condition of the alignment film for eliminating the uneven pattern 46. The alignment film 20 has no surface-treatment region. The surface-treated regions 54 of the other alignment film 24 entirely cover the alignment film 24.

Figure 17A:
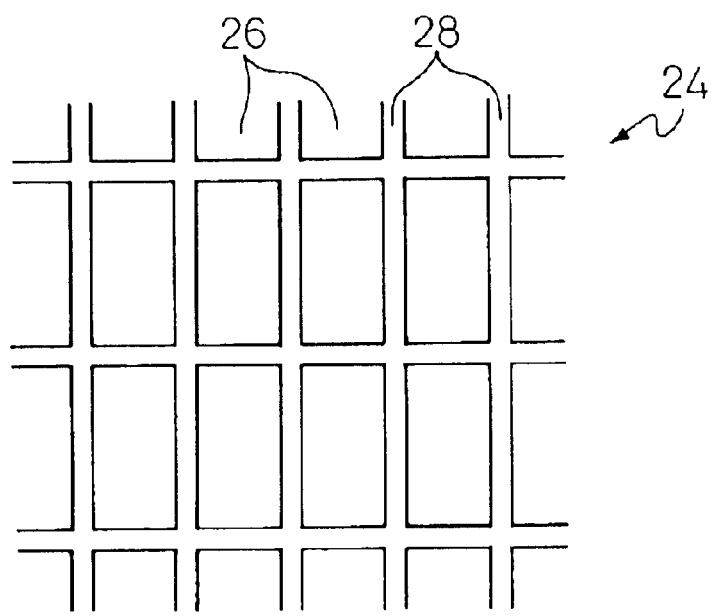
FIGS. 17A and 17B are views illustrating a yet further example of the surface treatment for the alignment films.
Figure 17B:
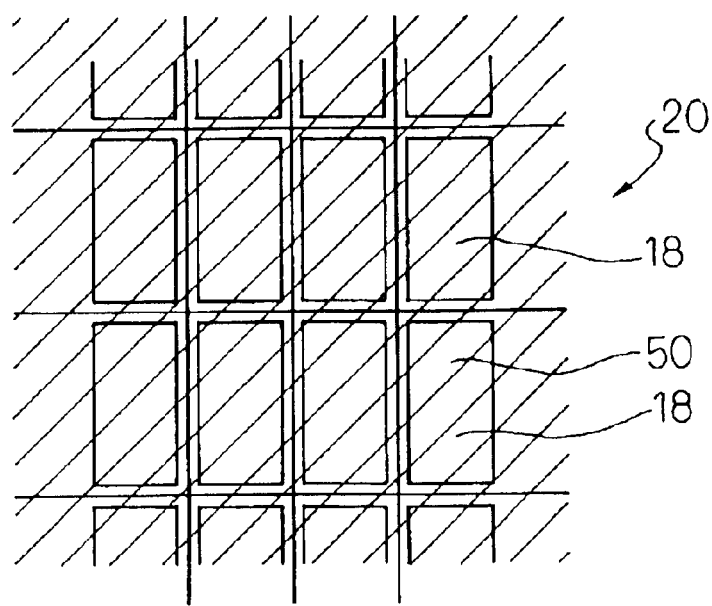

FIGS. 17A and 17B are views illustrating a still further example of the treatment for changing the surface condition of the alignment film for eliminating the uneven pattern 46. The alignment film 24 has no surface-treated region. The surface-treated regions 50 of the other alignment film 20 entirely cover the alignment film 20.

Figure 18:
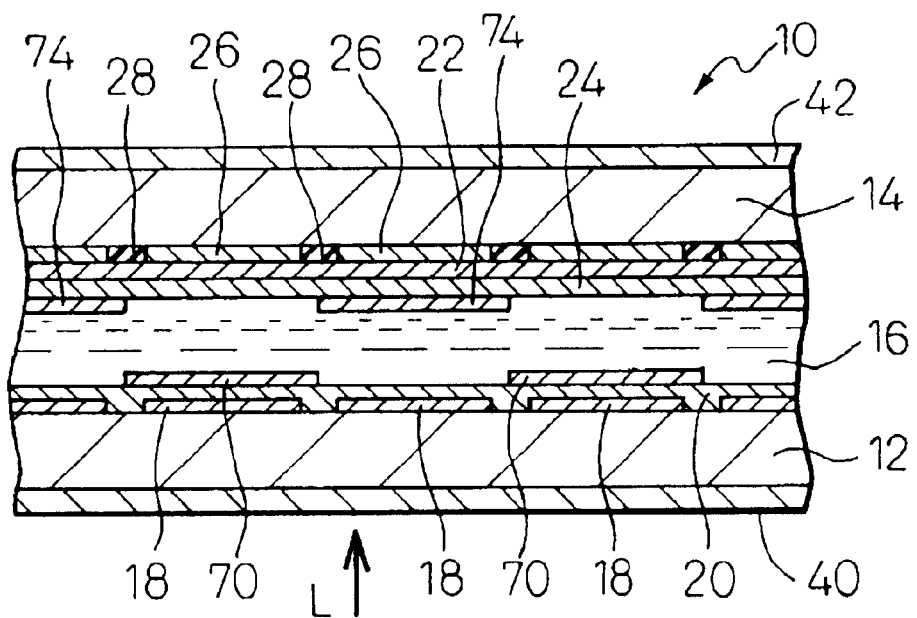
FIG. 18 is a cross-sectional view of the liquid crystal display panel according to another embodiment of the present invention.

FIG. 18 is a view illustrating another embodiment of the present invention. The liquid crystal display panel 10 according to this embodiment is constituted nearly in the same manner as the liquid crystal display panel 10 shown in FIGS. 2 to 4. In this embodiment, the surface treatment (for changing the surface condition of the alignment films 20, 24) is effected by changing the material of the alignment films 20, 24 instead of treating the surface of the alignment films 20 and 24 by the irradiation with ultraviolet rays. That is, an additional alignment film 70 of a different material is provided on the alignment film 20, and an additional alignment film 74 of a different material is provided on the alignment film 24. The additional alignment films 70 and 74 are so selected as to decrease the pretilt angle of the liquid crystal for the alignment films 20 and 24, and are arranged in, for example, the same pattern as the surface-treated regions 50 and 54 of FIG. 1. Even in this case, therefore, the uneven pattern 46 can be eliminated as in the embodiment of FIGS. 1 to 4. The additional alignment films 70 and 74 can be provided in compliance with the patterns shown in FIGS. 10 to 17.

According to the present invention as described above, it is possible to obtain a large liquid crystal display panel without an uneven pattern.

What is claimed is:

1. A twisted nematic liquid crystal display panel, comprising:
    a first substrate having bus lines, active elements, picture electrodes and a first alignment film treated by rubbing in a first direction;
    a second substrate, opposed to said first substrate, having a common electrode and a second alignment film treated by rubbing in a second direction different than the first direction, at least one of the first and second alignment films being at least partially treated by irradiation with ultraviolet rays such that a surface condition thereof is changed; and
    a liquid crystal between said first and second substrates, the rubbing and irradiation of the at least one of the first and second alignment films resulting in liquid crystal molecules between said first and second alignment films having a uniform alignment by being aligned in a substantially identical tilting direction throughout a plurality of pixels during application of a voltage for an extended period of time.

2. A liquid crystal display panel according to claim 1, wherein the Irradiation with ultraviolet rays is effected while maintaining an energy of not less than 2500 mJ.

3. A liquid crystal display panel according to claim 1, wherein the rubbing to orient the liquid crystal molecules is effected after the irradiation to change the surface condition of the at least one of said first and second alignment films.

4. A liquid crystal display panel according to claim 1, wherein the treatment for changing the surface condition of said at least one alignment film is effected for both said first and second alignment films.

5. A liquid crystal display panel according to claim 4, wherein the treatment for changing the surface condition of said at least one alignment film is effected by changing the surface condition of part of said first alignment film and for part of said second alignment film.

6. A liquid crystal display panel according to claim 5, wherein treated portions of said first alignment film are in alignment with nontreated portions of said second alignment film, and nontreated portions of said first alignment film are in alignment with treated portions of said second alignment film.

7. A liquid crystal display panel according to claim 1, wherein the treatment for changing the surface condition of said at least one alignment film is effected for one of said first and second alignment films.

8. A liquid crystal display panel according to claim 7, wherein the treatment for changing the surface condition of said at least one alignment film is effected for the whole surface of one of said first and second alignment films.

9. A liquid crystal display panel according to claim 7, wherein the treatment for changing the surface condition of said at least one alignment film is partly effected for either one of said first alignment film or said second alignment film.

10. A liquid crystal display panel according to claim 7, wherein the bus lines include gate and drain bus lines, and wherein the one of said first and second alignment films is treated in areas corresponding to the picture electrodes and avoiding the gate and drain bus lines.

11. A liquid crystal display panel according to claim 7, further comprising a black matrix framing the picture electrodes, and wherein the one of said first and second alignment films is treated in correspondence with the black matrix.

12. A liquid crystal display panel according to claim 1, wherein the treatment for changing the surface condition of said at least one alignment film is effected for at least either one of said first alignment film or said second alignment film in a striped fashion traversing a plurality of pixel regions.

13. A liquid crystal display panel according to claim 1, wherein a spacer is inserted between the first substrate and the second substrate.

14. A liquid crystal display panel according to claim 1, wherein said liquid crystal has a cell gap smaller than 5 $\mu$m.

15. A liquid crystal display panel, comprising:
    a first substrate having bus lines, active elements, picture electrodes and a first alignment film treated by rubbing in a first direction;
    a second substrate, opposed to said first substrate, having a common electrode and a second alignment film treated by rubbing in a second direction different than the first direction, at least one of the first and second alignment films being at least partially treated in regions covering the bus lines, but not in pixel regions, by irradiation with ultraviolet rays such that a surface condition thereof is changed; and
    a liquid crystal inserted between said first and second substrates, the rubbing and irradiation of the first and second alignment films resulting in liquid crystal molecules between the first and second alignment films being aligned in a generally constant tilting direction when a voltage is applied.

16. A liquid crystal display panel, comprising:
    a first substrate having bus lines, active elements, picture electrodes and a first alignment film treated by rubbing in a first direction;
    a second substrate, opposed to said first substrate, having a common electrode and a second alignment film treated by rubbing in a second direction different than the first direction, at least one of the first and second alignment films being at least partially treated in regions covering the bus lines, but not completely covering pixel regions adjacent to the bus lines, by irradiation with ultraviolet rays such that a surface condition thereof is changed; and
    a liquid crystal inserted between said first and second substrates, the rubbing and irradiation of the first and second alignment films resulting in liquid crystal molecules between the first and second alignment films being aligned in a generally constant tilting direction when a voltage is applied.

17. A liquid crystal display panel, comprising:

a first substrate having bus lines, active elements, picture electrodes and a first alignment film treated by rubbing in a first direction;

a second substrate, opposed to said first substrate, having a common electrode and a second alignment film treated by rubbing in a second direction different than the first direction, at least one of the first and second alignment films being at least partially treated in regions covering only the bus lines and part of pixel regions on only one side of the bus lines, by irradiation with ultraviolet rays such that a surface condition thereof is changed; and a liquid crystal inserted between said first and second substrates, the rubbing and irradiation of the first and second alignment films resulting in liquid crystal molecules between the first and second alignment films being aligned in a generally constant tilting direction when a voltage is applied.

\* \* \* \* \*

UNITED STATES PATENT AND TRADEMARK OFFICE
CERTIFICATE OF CORRECTION

PATENT NO. : 6,791,646 B2
DATED : September 14, 2004
INVENTOR(S) : Hiroyasu Inoue et al.

Page 1 of 1

It is certified that error appears in the above-identified patent and that said Letters Patent is hereby corrected as shown below:

Title page,
Item [75], Inventors, add -- Tsuyoshi Kamada, Kawasaki (JP), Yoji Nagase, Kawasaki (JP), Tadashi Hasegawa, Kawasaki (JP), Minoru Otani, Kawasaki (JP), Satoshi Murata, Kawasaki (JP), Yoji Taniguchi, Kawasaki (JP), Kenji Okamoto, Kawasaki (JP), Teiji Majima, Kawasaki (JP), Katsushige Asada, Kawasaki (JP) --

Column 9,
Line 41, change "Irradiation" to -- irradiation --

Signed and Sealed this

Eighth Day of February, 2005

JON W. DUDAS
*Director of the United States Patent and Trademark Office*